United States Patent Office 2,940,796
Patented June 14, 1960

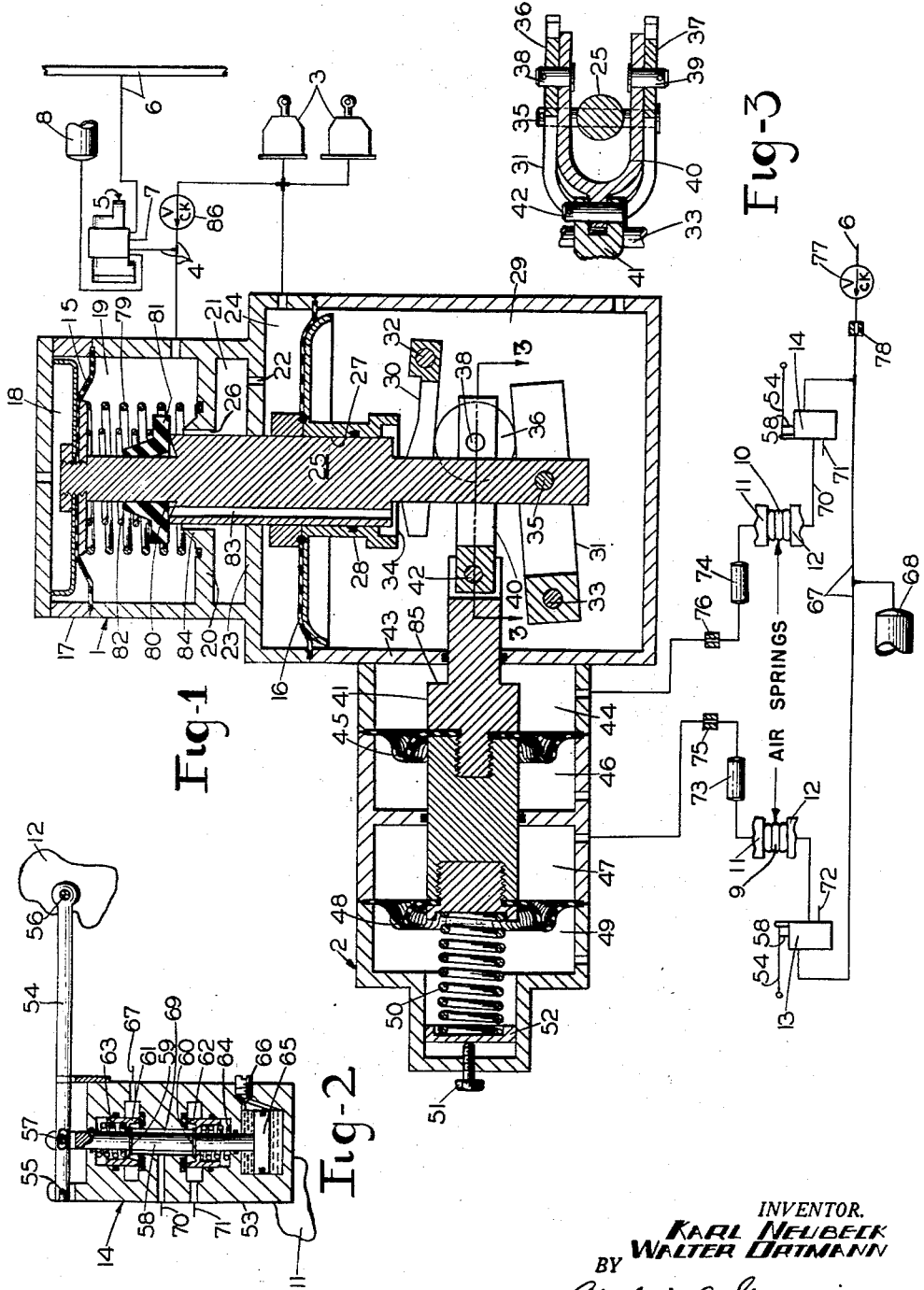

2,940,796
LOAD-RESPONSIVE BRAKE CONTROL APPARATUS

Walter Ortmann, Hannover-Herrenhausen, and Karl Neubeck, Hannover, Germany, assignors to Westinghouse-Bremsen-Gesellschaft m.b.H., Hannover, Germany Filed July 1, 1958, Ser. No. 745,954

Claims priority, application Germany July 8, 1957

9 Claims. (Cl. 303—22)

This invention relates to load responsive brake control apparatus and more particularly to such apparatus embodying a brake cylinder relay valve device, the proportionality constant of which is varied according to vehicle load, such as may be denoted by pressure of fluid in an air spring means in which the pressure of fluid is varied as necessary to maintain a sprung portion of the vehicle at a substantially constant preselected height relative to an unsprung portion of the vehicle and which pressure is thus indicative of vehicle load.

According to the invention, a load responsive brake control apparatus is provided comprising two coaxially arranged pistons which are not positively connected to each other and are disposed at opposite sides of a casing partition and reciprocable within a casing; said pistons being subject at their non-adjacent sides to atmospheric pressure and subject respectively at their adjacent sides to pressures of fluid in a brake cylinder and in a control pipe in which fluid pressure is increased for causing a brake application and reduced for causing a brake release. Valve means operably controlled by these pistons operate to provide in the brake cylinder fluid which is a load-controlled proportion of the pressure of fluid supplied to the control pipe. This proportion is varied according to the position of a rollable fulcrum which is interposed between and engages a pair of lever means each of which is operatively connected to a respective one of said pistons; the brake cylinder pressure being at a maximum proportion of the pressure of fluid in the control pipe when the axis of said rollable fulcrum is in the same plane as the axis of said pistons, and brake cylinder pressure being at some lesser proportion according to the distance the axis of said fulcrum is shifted at right angles away from said plane. The position of the rollable fulcrum is, in turn, controlled by a load-controlled device which is preferably of the type comprising two coaxially connected movable abutments operatively connected to the fulcrum and each subject to pressure of fluid in a respective air spring near one end of, but at opposite sides of, a railway car such that the pressure of fluid in both of said air springs act to apply a cumulative force to said movable abutments which opposes an adjustable force of a resilient bias.

With this arrangement, the fulcrum will be positioned according to the average load condition at said one end of the car, in the event (as will usually be the case) the pressures of fluid in the respective air springs is unequal due to unequal distribution of the weight of the lading within the car.

It will be understood that similar load responsive brake control apparatus can be used for controlling pressures of fluid in the brake cylinders at the opposite end of the car, in which case both of the load responsive brake control apparatuses can be controlled from branches of a common control pipe, the pressure of fluid in which may be varied by a conventional triple valve or may be varied by direct connection of said branches with a straight air pipe.

In the accompanying drawing, Fig. 1 is a diagrammatic view, partly in section and partly in outline, of a fluid pressure brake apparatus embodying the invention; Fig. 2 is a diagrammatic view, in section and to enlarged scale, of a leveling valve device shown in outline in Fig. 1; and Fig. 3 is a sectional view taken along the line 3—3 of Fig. 1.

Description

As shown in the drawing, the brake apparatus embodying the invention comprises a brake cylinder relay valve device 1, the proportionality constant of which is regulated by a load-controlled device 2, for controlling the pressure of fluid in brake cylinders 3 at one end of a vehicle (one at each side of the vehicle) to a load-controlled proportion of the pressure of fluid supplied to device 1 via a control pipe 4, which may be connected to a triple valve device 5 (as shown) or, if preferred, to a conventional straight air pipe. The triple valve device 5 may be of any well-known type which responds to charging of a brake pipe 6 to release fluid under pressure from pipe 4 via a release pipe 7 and supply fluid under pressure to a pipe leading to an auxiliary reservoir 8, and responds to a reduction in brake pipe pressure below its normal charge value to cut off the brake pipe from the auxiliary reservoir and supply fluid under pressure from the auxiliary reservoir to the brake cylinders 3. A pair of air springs 9, 10 are disposed at opposite transverse sides of, and adjacent one end of, a railway vehicle and are each interposed between and engage a sprung portion 11 and an unsprung portion 12 of said vehicle for resiliently supporting the sprung portion relative to the unsprung portion. A pair of leveling valve devices 13, 14 vary the pressure of fluid in the respective air springs 9, 10 as necessary to maintain the sprung portion at said one end of the vehicle at a substantially uniform height above the rails irrespective of the loads supported by the respective air springs.

The brake cylinder relay valve device 1 comprises two coaxially arranged diaphragm pistons 15, 16 which are reciprocable within a sectionalized casing 17 and not positively connected to each other. The effective area of annular piston 16 is at least equal to and may be greater than that of the piston 15. Piston 15 has at one side an atmospheric chamber 18 and at the opposite side a chamber 19 which is constantly open to control pipe 4 and is separated by a casing partition 20 from a chamber 21 that, in turn, is open via a port 22 in a casing partition 23 to a chamber 24 which is constantly open to the brake cylinders 3. Coaxially connected to piston 15 is a reduced diameter portion of a stem 25 that has a main portion that extends with radial clearance through a coaxially arranged bore 26 in casing partition 20 and has slidably guided contact with the wall of a coaxially arranged bore through casing partition 23 and projects through, and has sealing slidably guided contact with the wall of, a central opening 27 through an annular follower assemblage 28 which is coaxially connected to annular piston 16. Piston 16 is exposed at one side to brake cylinder pressure in chamber 24 and at the opposite side to atmospheric pressure in a chamber 29.

Two spaced levers 30, 31 are disposed in chamber 29 and hingedly connected to the casing 17 by respective pins 32, 33 that have parallel axes and are disposed at opposite sides of the axis of stem 25. The unconnected parts of these levers 30, 31 are in the form of yokes which straddle with substantial clearance a reduced diameter part of stem 25 that depends from the main portion thereof. The upper surface of the yoke of lever 30 bears against the lower end 34 of follower assemblage 28, whereas the yoke of lever 31 is hingedly connected intermediate its ends to said reduced diameter part of stem 25 by a pin 35 having an axis parallel to those of pins 32, 33 (see Fig. 3).

Referring to Figs. 1 and 3, the load-controlled device 2 comprises fulcrum means preferably in the form of a pair of rollers 36, 37 which are disposed between the levers 30, 31 such that each will engage the adjacent surfaces of vertically aligned arms of the respective yokes of said levers. These rollers 36, 37 are rotatably carried on respective parallel arranged pins 38, 39 that, in turn, are carried by respective arms of a yoked part of a lever 40 that straddles the stem 25 inwardly of the yokes of levers 30, 31 and is rockably connected at its unyoked end to a follower rod assemblage 41 by a transverse pin 42 that is carried by a clevised end portion of said follower rod assemblage. The follower rod assemblage 41 extends sealingly through a casing partition 43 separating atmospheric chamber 29 from a pressure chamber 44 at one side of a movable abutment, such as an annular flexible diaphragm 45, and also extends sealingly through a casing partition separating an atmospheric chamber 46 at the opposite side of said diaphragm from a pressure chamber 47 at one side of a similar movable abutment, such as a diaphragm 48, having an atmospheric chamber 49 at its opposite side. These diaphragms 45, 48 are of equal effective areas and coaxially arranged and both connected to the common follower rod assemblage 41, so as to constitute a movable abutment stack. This stack is subject to the cumulative pressures of fluid in pressure chambers 44, 47 which act thereon in opposition to the resilient bias of a regulating spring 50 that is disposed in chamber 49. An adjusting screw 51, which is carried by the casing and bears against an axially movable spring seat 52 for spring 50, permits adjustment of the resilient bias of said spring according to the ranges of pressures anticipated in the air springs 9, 10 on a particular vehicle and which air springs control the pressures of fluid in the chambers 47, 44 respectively, in the manner presently to be described.

As shown in Fig. 2, the leveling valve device 14 may comprise, briefly, a valve body 53 secured to sprung portion 11 of the vehicle and a control lever 54 that at its respective ends is pivotally connected to body 53 by a pin 55 and to the unsprung portion 12 by a pin 56. Intermediate the pins 55, 56, lever 54 has an axially elongated slot carrying a pin 57 whereby said lever is operatively connected to a valve stem 58 that extends interiorly of the body and has spaced collars 59, 60 which are interposed between and adapted to selectively engage and unseat, one or the other of two oppositely seating valves 61, 62 that are normally concurrently seated by springs 63, 64, respectively. To the innermost end of valve stem 58 is coaxially connected a pulsation dampening piston 65; and an adjustable needle valve 66 is provided for controlling the rate at which hydraulic fluid may be displaced from one side of said piston to the other, and vice versa, so as to assure that the valves 61, 62 will not be unseated by temporary fluctuations in air spring pressure due to oscillation of the unsprung portion 11 while the vehicle is moving and will be unseated only if there is a permanent change in air spring pressure due to a change in load condition of the vehicle.

When vehicle load is increased, existing air spring pressure will be insufficient for the new load condition; hence valve body 53 will be carried downwardly with sprung portion 11 a greater distance than the valve stem 58 (due to the difference in their moment arms with respect to the fulcrum pin 56 for control lever 54). Hence, valve stem 58 will be moved upwardly relative to the valve body 53 and, through collar 59, unseat the supply valve 61 against resistance of spring 63. With supply valve 61 unseated, a pipe 67 leading to a supply reservoir 68 is connected to an annular space 69 that encircles valve stem 58 and is constantly open to the corresponding air spring 10 via a pipe 70, for thereby causing fluid under pressure to flow to said air spring. As air spring pressure increases, the valve body 53 will be moved upwardly a greater degree than valve stem 58 with the result that said stem and hence its collar 59 will be moved downwardly relative to the valve body and thereby enable spring 63 to reseat supply valve 61 for bottling up fluid under pressure in air spring 10. During the above-described movements of valve stem 58 relative to body 53, spring 64 will maintain the exhaust valve 62 seated.

When vehicle load is decreased, air spring pressure will be excessive for the new load condition; hence valve body 53 will be carried upwardly with sprung portion 11 a greater degree than valve stem 58, with the result that said valve stem will be moved downwardly relative to the valve body and through collar 60 unseat exhaust valve 62 against resistance of spring 64. With exhaust valve 62 unseated, annular space 69 and hence pipe 70 will be connected to an exhaust pipe 71 for releasing fluid under pressure from the corresponding air spring 10 until collar 60 is moved sufficiently upward relative to the valve body 53 to enable spring 64 to reseat exhaust valve 62 and thus once again bottle up fluid under pressure in air spring 10; it being noted that during unseating and reseating of the exhaust valve, the supply valve 61 will be maintained seated by spring 63.

Thus, the leveling valve device 14 operates to so control the pressure of fluid in the air spring 10 as to maintain the sprung portion 11 at a substantially constant preselected height relative to unsprung portion 12.

The leveling valve device 13, which is preferably identical with valve device 14, operates in similar manner to control connection of air spring 9 with a branch of supply reservoir pipe 67 or an exhaust pipe 72.

The air springs 9, 10 are preferably connected by way of stabilization volumes 73, 74 and baffle chokes 75, 76 to pressure chambers 47, 44 respectively, of device 2.

*Operation*

Assume initially that the brake pipe 6 has been charged to its normal charge value by supply of fluid under pressure to the brake pipe at the locomotive in the well-known manner; that in consequence thereof, the triple valve device 5 has operated to connect pipe 4 to release pipe 7 and charge the auxiliary reservoir 8 to equality with brake pipe pressure; that the supply reservoir 68 is charged with fluid under pressure, such as from the brake pipe by way of a check valve 77 and a choke 78; and that the leveling valve devices 13, 14 have operated, in the manner above described, to provide in the air springs 9, 10 and thereby in the chambers 47, 44 fluid at respective pressures which are sufficient to maintain the sprung portion 11 at the aforementioned one end of the vehicle at the preselected constant height relative to the unsprung portion 12.

Under these conditions, the pressures of fluid in chambers 47, 44 will act cumulatively against the preadjusted opposing pressure of spring 50 to dispose the stack 48, 45, 41, and thus the rollers 36, 37 in a particular transverse position with respect to stem 25, which position is truly indicative of the average load condition at the aforementioned one end of the vehicle.

It will be understood, that, in cases where the vehicle has a load-carrying axle and wheels at its opposite end, a brake cylinder relay valve device, load-controlled device, air springs, leveling valve devices, and stabilizing reservoirs identical with the devices 1, 2, 9 and 10, 13 and 14, and 76 and 77 will be provided for controlling the pressures of fluid in the associated air springs and brake cylinders. In such cases, a branch of pipe 4 will be connected to the brake cylinder relay valve device at said opposite end of the vehicle, so that only one triple valve device 5 and auxiliary reservoir 8 (or straight air pipe, if used in lieu of a triple valve) need be used for each vehicle.

With pipe 4 vented, a helical spring 79, which is disposed in chamber 19 of device 1 and backed up against casing partition 20, bears against diaphragm piston 15 for biasing the diaphragm piston stack 15, 16, 25 to a supply position, in which it is shown in the drawing. With the stack in this position, an exhaust valve 80 carried by stem 25 abuttingly engages an annular supply valve 81 and holds it unseated against resistance of a lighter spring 82, for thereby connecting brake cylinders 3 and chamber 24 to the vented pipe 4 and also disconnecting the brake cylinders from a vent passage 83 that extends from atmospheric chamber 29 through the main portion of stem 25 and opens through a beveled shoulder (that joins said main portion with the reduced diameter portion) at a point radially inward of the outer, exhaust-valve-defining rim of said shoulder. It is to be noted that the annular supply valve 81 encircles and is movable relative to the reduced diameter portion of stem 25, and that it is sealable by pressure of fluid in chamber 19 against exhaust valve 80 and/or against an annular supply valve seat rib 84 that encircles bore 26 and projects into chamber 19.

When brake pipe pressure is reduced at the locomotive for causing a brake application and the triple valve device 5 operates to supply fluid from the auxiliary reservoir 8 to pipe 4 at a pressure corresponding to the extent of such reduction, such fluid will flow from pipe 4 and past unseated supply valve 81 to chamber 24 and the brake cylinders 3.

Pressure of fluid thus supplied to chamber 24 and acting on piston 16 will exert a downward force via follower assemblage 28 on lever 30 which, with the rollers 36, 37 positioned out of line with the axis of stem 25, as shown, will cause a multiplied downward force to be imposed via said rollers on lever 31, which multiplied force will impose an even greater or further multiplied downward force on pin 35 (due to the difference in moment arms of the rollers and pin 35 relative to pin 33); said greater downward force opposing the upward force exerted on pin 35 through stem 25 by pressure of fluid in chamber 19 and pressure of spring 79 acting on piston 15. It will thus be apparent that when brake cylinder pressure in chamber 24 has increased to a value sufficient to cause said greater downward force to slightly exceed the said upward force, the stack 15, 16, 25 will be moved downwardly and thus permit spring 82 to seat supply valve 81 against rib 84 while the exhaust valve 80 is maintained seated against said supply valve, for thereby bottling up fluid in the brake cylinders 3 at a pressure which is a load-controlled proportion of the pressure of fluid supplied to pipe 4. This load-controlled proportion will correspond to the proportionality constant for the brake cylinder relay valve device 1 as adjusted by the degree of eccentricity of the axis of rollers 36, 37 with respect to the axis of stem 25. In other words, as such eccentricity increases, the downward force imposed on pin 35 by a given unit fluid pressure in chamber 24 will be correspondingly increased and thus result in brake cylinder pressure being lapped or bottled up at a lesser pressure.

If, on the other hand, the axes of rollers 36, 37 intersect the axis of stem 25, it will be apparent that the downward force exerted by brake cylinder pressure on piston 16 will not be multiplied because such downward force will act in a direct line on pin 35 through the medium of lever 30, rollers 36, 37 and lever 31. Under this condition, the brake cylinder pressure obtained will be controlled solely by the ratio of the effective areas of the pistons 15, 16. In other words, if such effective areas are equal, brake cylinder pressure will be equal to control pipe pressure, whereas if the effective area of piston 16 exceeds that of piston 15, brake cylinder pressure will be some lesser proportion of the control pipe pressure.

It will be apparent that if the rollers 36, 37 should, under a maximum load condition, be shifted leftward of the axis of stem 25, the downward force imposed on pin 35 by brake cylinder pressure acting on piston 16 will be divided, rather than multiplied. However, since the brake cylinders 3 are charged from the control pipe 4, brake cylinder pressure cannot exceed, and will thus be equal to, control pipe pressure; and hence the stack 15, 16, 25 will operate to maintain the supply valve 81 unseated, such that the brake cylinder relay valve device 1 will be rendered ineffective and brake cylinder pressure will be controlled as if the control pipe 4 were connected directly to the brake cylinders 3 at the aforementioned one end of the vehicle. However, if load at the other end of the vehicle is less than maximum, the corresponding brake cylinder relay valve device will provide correspondingly reduced pressures in the brake cylinders at said other end of the vehicle. If desired, however, some stop means may be provided, such as a collar (not shown) on the part of follower rod assemblage 41 in chamber 46 which could engage the casing partition between chambers 46, 47 to prevent the rollers 36, 37 from being carried leftward of the axis of stem 25; but from the foregoing, it will be apparent that such stop means is not essential. In any event, however, a stop shoulder 85 is provided on the assemblage 41 to contact casing partition 43 for defining a rightmost position of rollers 36, 37, so that if for any reason (such as malfunction of the leveling valve devices 13, 14, rupture of supply pipe 67 or pipe 70, etc.), the air springs 9, 10 should be vented, a brake cylinder pressure will be provided which is at least a chosen minimum proportion of the pressure of fluid supplied to control pipe 4 and these rollers will not be pushed rightward out of contact with the yokes of levers 30, 31 by pressure of spring 50.

When control pipe pressure and hence pressure in chamber 19 is reduced for releasing brakes, the consequent reduction in the upward force exerted on pin 35 by such pressure acting on piston 15 will cause the stack 15, 16, 25 to be moved downwardly by the preponderating downward force exerted on pin 35 by brake cylinder pressure acting on piston 16 through levers 30, 31 and rollers 36, 37. During this downward movement of the stack, the exhaust valve 80 will be unseated from the supply valve 81 (which will be maintained seated on seat rib 84 by spring 82) for thereby causing fluid under pressure to flow from the brake cylinders 3 via chambers 24, 21 and the clearance between stem 25 and bore 26 and thence past the unseated exhaust valve 80 to vent passage 83. If control pipe pressure is only partially reduced, brake cylinder pressure will be proportionately reduced; whereupon the exhaust valve 80 will be reseated for again bottling up fluid in the brake cylinders at such reduced pressure.

If the control pipe 4 is vented, brake cylinder pressure can be substantially vented past the exhaust valve 80; but since the pressure of spring 79 will cause the exhaust valve 80 to reseat and thereby trap some air at very low pressure in the brake cylinders 3, it is preferable (even though the pressures of the brake cylinder return springs (not shown) should be sufficient to release brakes despite such low entrapped pressure) to provide a check valve 86 which will permit brake cylinder pressure to be released at large capacity into the control pipe 4 in bypass of the device 1 but prevent such bypassing flow in the reverse direction, and thereby permit complete venting of brake cylinder pressure.

Some brake cylinder pressure may be released via check valve 86 during partial releases of a brake application, if control pipe pressure should be reduced to a value below brake cylinder pressure; although in those cases where brake cylinder pressure is proportionately less than control pipe pressure it will be apparent that release of brake cylinder pressure will be controlled primarily by exhaust valve 80. Exhaust valve 80 also serves the useful purpose (even if check valve 86 is used) of permitting brake cylinder pressure to be proportionately reduced if load is decreased while brakes are applied (such as can be caused by passengers moving from one end of the car toward the other end, or to a different car, as a train pulls into a station) for thereby preventing overbraking at said one end of the car.

Having now described the invention, what we claim as new and desire to secure by Letters Patent is:

1. In a fluid pressure brake apparatus for use with a vehicle having air spring means in which the fluid pressure is varied as necessary to maintain a sprung portion at a substantially constant preselected height relative to an unsprung portion of the vehicle irrespective of load condition of the vehicle, a brake cylinder, and a control pipe in which fluid pressure is increased for causing a brake application and reduced for causing a brake release, the combination of casing means, two co-axially arranged pistons reciprocable within said casing means, one of said pistons having a central opening and the other of said pistons having a coaxially connected stem which projects through said opening, said one piston and other piston being subject at their adjacent sides respectively to brake cylinder pressure and to control pipe pressure and subject at their respective non-adjacent sides to atmospheric pressure, two lever means hingedly carried by said casing means so as to be oppositely swingable during a brake application and spaced with respect to the axis of said stem, one of said lever means operatively engaging the atmospheric side of said one piston, the other of said lever means having hinged connection with the projecting portion of said stem, fulcrum means movable generally transversely of said axis and operatively engaging the adjacent surfaces of both of said spaced lever means, valve means controlled according to the axial positions of said pistons for providing in the brake cylinder fluid at a pressure which is a proportion of the pressure provided in the control pipe as adjusted according to the position of said fulcrum means, and load-controlled means operative to position said fulcrum means in any of a plurality of transverse positions according to vehicle load as denoted by existing air spring pressure.

2. An apparatus according to claim 1, wherein the adjusted proportion is at a maximum, to provide the highest brake cylinder pressure for a given degree of pressurization of the control pipe, when the axis of said fulcrum means lies in the same plane as the axis of said stem, as will occur under a maximum load condition.

3. An apparatus according to claim 1, wherein the air spring means comprises two air springs each disposed near different sides and at one end of the vehicle; and wherein said load-controlled means comprises resilient means, and two coaxially connected movable abutments arranged in a stack and positively connected to said fulcrum means, said stack being subject to the pressures of fluid in each of said air springs acting on a respective one of said movable abutments so as to apply a cumulative force to said stack opposing the force of said resilient means, whereby the position of said stack and thus of said fulcrum means will be controlled according to the pressures in both of said air springs for providing a brake cylinder pressure which is essentially proportional to the average of the pressures in said air springs.

4. An apparatus according to claim 3, including choke means interposed between each of said air springs and the corresponding one of said movable abutments for damping out any fluctuations in the pressures of fluid in said air springs arising from oscillation of the sprung portion during movement of the vehicle.

5. In a vehicle fluid pressure brake apparatus of the type comprising a brake cylinder, and a control pipe in which fluid pressure is increased for causing a brake application and reduced for causing a brake release, the combination of casing means providing one chamber open to the brake cylinder and another chamber open to the control pipe, said chambers being separated by a casing partition having a bore encircled by an annular supply valve seat extending into said other chamber, two coaxially arranged pistons reciprocable within said casing means and disposed at opposite sides of said casing partition, one of said pistons having a central through opening, a stem having a reduced diameter portion coaxially connected to the other of said pistons and joined to a main portion by a shoulder defining an exhaust valve that controls connection of said one chamber with the atmosphere, the main portion of said stem projecting with radial clearance through said casing partition and through said opening, said one piston and said other piston being subject at their adjacent sides respectively to fluid pressures in said one chamber and in said other chamber and subject at their respective non-adjacent sides to atmospheric pressure, two lever means hingedly carried by said casing means and spaced with respect to the axis of said stem, one of said lever means operatively engaging the atmospheric side of said one piston in encirclement of said opening, the other of said lever means having hinged connection with the projecting main portion of said stem, fulcrum means movable generally transversely of said axis and operatively engaging the adjacent surfaces of both of said spaced lever means, an annular supply valve controlling communication between said chambers and sealingly encircling and slidable relative to said reduced diameter portion of said stem, first resilient means for biasing said supply valve into contact with said supply valve seat, stronger resilient means for biasing said other piston and thereby said exhaust valve into abutting contact with said supply valve for normally seating the exhaust valve and unseating the supply valve against pressure of said first resilient means, said supply valve and exhaust valve being controlled according to the axial positioning of said pistons for providing in said one chamber and brake cylinder fluid at a pressure which is a proportion of the pressure provided by the control pipe in said other chamber, which proportion is varied according to the transverse position of said fulcrum means, and means controlled according to vehicle load for shifting said fulcrum means transversely to one of a plurality of positions for thereby varying said proportion according to vehicle load.

6. The combination according to claim 5, including air spring means in which the pressure of fluid is varied as necessary to maintain a sprung portion of the vehicle at a substantially constant preselected height relative to an unsprung portion of the vehicle irrespective of vehicle load, and wherein the means controlled according to vehicle load comprises movable abutment means subject to pressure of fluid in said air spring means opposing pressure of a resilient bias and operably connected to said fulcrum means, said movable abutment means and said two lever means being so disposed that as pressure in said air spring means increases said fulcrum means will be carried toward the axis of said stem such that as vehicle load increases increasing brake cylinder pressures will be provided for a given degree of pressurization of the control pipe.

7. The combination according to claim 5, including check valve means for permitting release flow from the brake cylinder to the control pipe in bypass of said supply valve and exhaust valve and preventing such bypassing flow in the reverse direction.

8. Fluid pressure brake apparatus for use on a vehicle of the type having two air springs each disposed near different sides of and adjacent one end of the vehicle and interposed between a sprung portion and an unsprung portion of the vehicle, at least one brake cylinder to apply a braking force to the wheels at said one end of the vehicle, a pair of leveling valves each operatively connected to the sprung portion and unsprung portion in proximity of each air spring to vary the pressure in the respective air spring as necessary to maintain the sprung portion at a substantially constant preselected height relative to the unsprung portion, said apparatus comprising a control pipe in which pressure of fluid is increased for causing a brake application and reduced for causing a brake release; a brake cylinder relay valve device including casing means, two coaxially arranged independently movable pistons reciprocable in said casing means, one of said pistons being subject to brake cylinder pressure such as to act in opposition to control pipe pressure acting on the other of said pistons, a stem coaxially connected to said other piston and projecting centrally through an annular opening through said one piston and into an atmospheric chamber, and valve means controlled according to the positioning of said pistons for providing in said brake cylinder fluid at a pressure which is an adjusted proportion of the pressure of fluid provided in the control pipe, two spaced lever means one of which is operatively connected to the atmospheric side of said one piston and the other of which is connected to the projecting portion of said stem of said other piston, each of said lever means being hingedly carried by said casing means such as to be oppositely swingable upon pressurization of the control pipe, fulcrum means interposed between and operatively engaging both of said lever means for providing an operating connection between said pistons; and load-controlled means comprising resilient means and two coaxially connected movable abutments arranged in a stack and positively connected to said fulcrum means, said stack being subject to the pressures of fluid in each of said air springs acting on a respective one of said movable abutments so as to apply a cumulative force to said stack opposing the force of said resilient means, whereby the position of said stack and thus of said fulcrum means will be controlled according to the pressures in both of said air springs for providing a brake cylinder pressure which is essentially proportional to the average of the pressures in said air springs.

9. An apparatus according to claim 8, including choke means interposed between each of said air springs and a corresponding one of said movable abutments for damping out any fluctuations in the pressures of fluid in said air springs arising from oscillation of the sprung portion during movement of the vehicle.

References Cited in the file of this patent

UNITED STATES PATENTS

| | | |
|---|---|---|
| 2,150,576 | Bell | Mar. 14, 1939 |
| 2,184,551 | Hewitt | Dec. 26, 1939 |
| 2,313,991 | Fitch | Mar. 16, 1943 |
| 2,720,428 | Erson | Oct. 11, 1955 |
| 2,720,429 | Newell | Oct. 11, 1955 |

FOREIGN PATENTS

| | | |
|---|---|---|
| 833,825 | Germany | Mar. 13, 1952 |
| 1,086,706 | France | Aug. 11, 1954 |